US012707338B2

(12) United States Patent
Gautam et al.

(10) Patent No.: US 12,707,338 B2
(45) Date of Patent: Aug. 11, 2026

(54) METHODS AND SYSTEMS FOR PROVIDING ENHANCED NETWORK SLICE ALLOCATION

(71) Applicant: Samsung Electronics Co., Ltd., Suwon-si (KR)

(72) Inventors: Deepanshu Gautam, Bangalore (IN); Jaijin Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 18/191,571

(22) Filed: Mar. 28, 2023

(65) Prior Publication Data

US 2023/0319645 A1 Oct. 5, 2023

(30) Foreign Application Priority Data

Mar. 30, 2022 (IN) ............................. 202241018757
Dec. 13, 2022 (IN) ............................. 2022 41018757

(51) Int. Cl.
*H04W 28/24* (2009.01)
*H04W 16/02* (2009.01)

(52) U.S. Cl.
CPC ........... *H04W 28/24* (2013.01); *H04W 16/02* (2013.01)

(58) Field of Classification Search
CPC ...... H04W 16/02; H04W 28/24; H04W 76/12
USPC ......................... 370/329, 331, 254, 328, 227
See application file for complete search history.

(56) References Cited

U.S. PATENT DOCUMENTS 12,192,820 B2 * 1/2025 Yeh ........................ G06N 3/045
2017/0070892 A1 * 3/2017 Song .................. H04L 41/5051
2018/0368053 A1 * 12/2018 Wei ....................... H04W 48/14
2019/0335392 A1 * 10/2019 Qiao ..................... H04W 48/16
2020/0014608 A1 1/2020 Xu et al.
2020/0112841 A1 * 4/2020 Kim ........................ H04W 4/70
2021/0105308 A1 * 4/2021 Bouazizi ............ H04L 65/1016

(Continued)

FOREIGN PATENT DOCUMENTS

KR 10-2019-0120833 A 10/2019

OTHER PUBLICATIONS

ETSI TS 128 531 V16.7.O(Oct. 2020)5G; Management and orchestration; Provisioning (3GPP TS 28.531 version 16.7.0 Release 16).*

(Continued)

*Primary Examiner* — Joseph Arevalo
(74) *Attorney, Agent, or Firm* — Jefferson IP Law, LLP

(57) ABSTRACT

The disclosure relates to a 5G or 6G communication system for supporting a higher data transmission rate. A device and a method for managing network slice subnet feasibility in a wireless network are provided. The method includes receiving, from a network slice subnet management service consumer entity, a request message for a feasibility check of at least one network slicing related requirement; performing the feasibility check to determine whether the at least one network slicing related requirement is supported by the provider entity; and transmitting, to the consumer entity, a response message, wherein the response message includes at least one recommended network slicing related requirement which is supported by the provider entity, in case that the at least one network slicing related requirement is not supported by the provider entity.

16 Claims, 7 Drawing Sheets

(56) References Cited

U.S. PATENT DOCUMENTS

| | | | | |
|---|---|---|---|---|
| 2021/0144790 | A1* | 5/2021 | Faccin | H04W 76/18 |
| 2022/0353802 | A1* | 11/2022 | Gupta | H04W 60/04 |
| 2022/0400401 | A1* | 12/2022 | Gupta | H04L 47/70 |
| 2024/0267869 | A1* | 8/2024 | Nayak | H04W 76/10 |

OTHER PUBLICATIONS

3rd Generation Partnership Project; Technical Specification Group Services and System Aspects; Management and orchestration; Provisioning; (Release 17)', 3GPP TS 28.531 V17.3.0, Mar. 22, 2022.

Huawei et al., 'Discussion on the issues for network slice subnet feasibility check', S5-214199, 3GPP TSG-SA5 Meeting #138-e, Aug. 13, 2021.

Samsung Research America, 'CR Rel-17 28.531 Fixing NetworkSlice and NetworkSliceSubnet Allocation and Deallocation Stage 2', S5-215408, 3GPP TSG-SA5 Meeting #139-e, Oct. 1, 2021.

Nokia et al., 'Rel-16 CR 28.531 Correction of provisioning services and procedures', S5-203304, 3GPP TSG-SA5 Meeting #131-e, May 15, 2020.

International Search report dated Jun. 21, 2023, issued in International Patent Application No. PCT/KR2023/004128.

Extended European Search Report dated May 21, 2025, issued in a European Patent Application No. 23781314.2.

3GPP TS 28.531 V16.7.0; 5G; Management and orchestration; Provisioning, Oct. 31, 2020.

ORAN.WG1.Slicing-Architecture-R003-v05.00, Jul. 19, 2021.

3rd Generation Partnership Project Technical Specification Group Services and System Aspects; Management and orchestration; Provisioning; (Release ADD. 17); 3GPP, Mar. 10, 2022.

Indian Office Action dated Apr. 16, 2026, issued in an Indian Patent Application No. 202241018757.

* cited by examiner

| Per Specturm Usage Status | Max Number of UEs | | Congestion | RAN Delay | | RAN Tput | |
|---|---|---|---|---|---|---|---|
| | Designed | Used | | Designed | Measured | DL | UL |
| 700MHz | 600UEs | 100UEs | 1/6 (16%) | 10ms | 7ms | 50Mbps | 5Mbps |
| 28GHz | 300UEs | 200UEs | Designed | 10ms | 6ms | 100Mbps | 20Mbps |

METHODS AND SYSTEMS FOR PROVIDING ENHANCED NETWORK SLICE ALLOCATION

CROSS REFERENCE TO RELATED APPLICATION(S)

This application is based on and claims priority under 35 U.S.C. § 119(a) of an Indian provisional patent application number 202241018757, filed on Mar. 30, 2022, in the Indian Patent Office, and of an Indian Complete patent application number 202241018757, filed on Dec. 13, 2022, in the Indian Patent Office, the disclosure of each of which is incorporated by reference herein in its entirety.

BACKGROUND

1. Field

The disclosure relates to a wireless communication networks. More particularly, the disclosure relates to managing network slice allocation in wireless communication networks by checking the network slice subnet feasibility in the wireless network.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

Communication networks enabled by technologies, such as network function virtualization (NFV) and software defined networking (SDN), may be organized to serve various customer requirements. In building advanced networks, to support future developments in wireless networks (including fifth generation (5G) networks), network slicing provides the ability to create isolated virtual networks over which different traffic flows can travel. Network slicing provides flexibility and adaptability in the characteristics of each slice.

Currently, fifth generation (5G) systems comprise of fifth generation access network (AN), a fifth generation core network (CN) and one or more user equipment (UE). The fifth generation system is expected to provide optimized support for a variety of different communication services, different traffic loads, and different end user communities. For example, the communication services using network slicing may include V2X services which can provide high-bandwidth, low latency and reliable communication between broad range of transport and traffic related in the network. The fifth generation system can enhance the capabilities to meet KPIs, emerging V2X application requirements. Thus, advanced applications in the fifth generation network requires high data rate, reliability, low latency, high communication range and speed.

Fifth generation network seamlessly uses enhanced mobile broadband (eMBB) to enable network slicing by providing service that defines a minimum level of data transfer rate, promising to deliver vastly increased bandwidth and decreased latency. Fixed mobile convergence (FMC) includes wireless-to-the-everything (WTTx) and fiber-to-the everything (FTTx) can provide native support for network slicing. For optimization and resource efficiency, the 5G system can select the most appropriate 3$^{rd}$ generation partnership project (3GPP) or non-3GPP access technology for a communication service, allowing multiple access technologies to be used simultaneously for one or more services active on user equipment (UE).

Thus, support for massive Internet of things (mIoT) brings new requirements in addition to mobile broadband (MBB) enhancements. Operators can use one or more network slice instances to provide communication services, with similar network characteristics, to different vertical industries. 3GPP TS 28.530 and 28.531 defines the management of network slice in 5G networks, which defines communication services providing network slice. Network slice instance (NSI) may support communication service instances (CSI). Similarly, CSI may utilize multiple NSIs.

Network slicing in the 5G networks enables to build dedicated logical networks on a shared infrastructure. The dedicated networks would permit the implementation of tailor-made functionality and network operation specific to each slice customer, rather than a one-size-fits-all approach as witnessed in the current and previous mobile generations, which would not be economically viable.

The existing mechanism states that the current slice allocation mechanism employs the service requirements as a part of service profile. The requirements for the slice subnet are derived from the service profile, which is called as slice profile.

In the existing mechanism, checking the network slice subnet feasibility comprises the network slice subnet management service consumer (NSSMS_C) submitting the required SLA requirements in terms of slice profile. The network slice subnet management service producer (NSSMS_P) checks whether the requirements can be fulfilled. If the requirements cannot be fulfilled, a failure message is returned stating that the requirements cannot be fulfilled. It does not provide feasible SLA requirements to the NSSMS_C which can be satisfied by the NSSMS_P. Due to which the consumer is unaware about the requirements supported by the producer and several feasibility check attempts will be required to understand the capabilities of the producer for fulfilling SLA requirements.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and device for managing network slice subnet feasibility in a wireless communication networks, wherein network slice allocation is managed in an efficient manner.

Another aspect of the disclosure is to provide methods and device for performing the feasibility check to determine whether the received request can be supported by the producer.

Another aspect of the disclosure is to provide methods and devices for sending at least one updates slice profile to the consumer on determining that the feasibility check is infeasible.

Another aspect of the disclosure is to provide methods and devices for creating an updated set of slice profile based on unsuccessful feasibility check.

Another aspect of the disclosure is to provide methods and devices for updating a plurality of slice profile of attributes based on an available slice subnet capability fetched from an inventory and received network slice requirements.

Additional aspects will be set forth in part in the description which follows and, in part, will be apparent from the description, or may be learned by practice of the presented embodiments.

In accordance with an aspect of the disclosure, a method for managing network slice subnet feasibility of a network slice subnet management service provider entity in a wireless network is provided. The method comprises receiving, from a network slice subnet management service consumer entity, a request message for a feasibility check of at least one network slicing related requirement; performing the feasibility check to determine whether the at least one network slicing related requirement is supported by the provider entity; and transmitting, to the consumer entity, a response message, wherein the response message includes at least one recommended network slicing related requirement which is supported by the provider entity, in case that the at least one network slicing related requirement is not supported by the provider entity.

In accordance with another aspect of the disclosure, the at least one network slicing related requirement includes at least one of service profile, and slice profile information.

In accordance with another aspect of the disclosure, the at least one recommended network slicing related requirement is used to adjust the at least one network slicing related requirement.

In accordance with another aspect of the disclosure, the at least one recommended network slicing related requirement is included in a FeasibilityCheckJob IOC (information object class).

In accordance with another aspect of the disclosure, The method comprises updating at least one slice profile with a plurality of attributes based on an available slice subnet capability fetched from an inventory and the at least one network slicing related requirement.

In accordance with an aspect of the disclosure, a network slice subnet management service provider entity for managing network slice subnet feasibility in a wireless network is provided. The provider entity comprises a transceiver, configured to transmit and receive a signal; and a controller, coupled to the transceiver and configured to: receive, from a network slice subnet management service consumer entity, a request message for a feasibility check of at least one network slicing related requirement, perform the feasibility check to determine whether the at least one network slicing related requirement is supported by the provider entity, and transmit, to the second network entity, a response message, wherein the response message includes at least one recommended network slicing related requirement which is supported by the provider entity, in case that the at least one network slicing related requirement is not supported by the provider entity.

In accordance with another aspect of the disclosure, the at least one network slicing related requirement includes at least one of service profile, and slice profile information.

In accordance with another aspect of the disclosure, the at least one recommended network slicing related requirement is used to adjust the at least one network slicing related requirement.

In accordance with another aspect of the disclosure, the at least one recommended network slicing related requirement is included in a FeasibilityCheckJob IOC (information object class).

In accordance with another aspect of the disclosure, the controller is further configured to: update at least one slice profile with a plurality of attributes based on an available slice subnet capability fetched from an inventory and the at least one network slicing related requirement.

In accordance with another aspect of the disclosure, a method for managing network slice subnet feasibility of a network slice subnet management service consumer entity in a wireless network is provided. The method comprises: transmitting, to a network slice subnet management service provider entity, a request message for a feasibility check of at least one network slicing related requirement; receiving, from the provider entity, a response message, wherein the response message includes at least one recommended network slicing related requirement which is supported by the provider entity, in case that the at least one network slicing related requirement is not supported by the provider entity.

In accordance with another aspect of the disclosure, the at least one network slicing related requirement includes at least one of service profile, and slice profile information, and the at least one recommended network slicing related requirement is included in a FeasibilityCheckJob IOC (information object class).

In accordance with another aspect of the disclosure, the method further comprises adjusting the at least one network slicing related requirement based on the at least one recommended network slicing related requirement, and the at least one network slicing related requirement is used to update at least one slice profile with a plurality of attributes.

In accordance with another aspect of the disclosure, a network slice subnet management service consumer entity for managing network slice subnet feasibility in a wireless network is provided, the consumer entity comprises a transceiver, configured to transmit and receive a signal; and a controller, coupled to the transceiver and configured to: transmit, to a network slice subnet management service provider entity, a request message for a feasibility check of at least one network slicing related requirement; receive, from the provider entity, a response message, In accordance with another aspect of the disclosure, the response message includes at least one recommended network slicing related requirement which is supported by the provider entity, in case that the at least one network slicing related requirement is not supported by the provider entity.

In accordance with another aspect of the disclosure, the at least one network slicing related requirement includes at least one of service profile, and slice profile information, and the at least one recommended network slicing related requirement is included in a FeasibilityCheckJob IOC (information object class).

In accordance with another aspect of the disclosure, the controller is further configured to adjust the at least one network slicing related requirement based on the at least one recommended network slicing related requirement, and the at least one network slicing related requirement is used to update at least one slice profile with a plurality of attributes.

In accordance with another aspect of the disclosure, the methods for managing network slice subnet feasibility in a wireless network are provided. The method includes receiving, by a network slice subnet management service producer (NSSMS_P), a request for feasibility check of at least one network slice requirement from a network slice subnet management service consumer (NSSMS_C), wherein the slice requirement includes at least one service profile and slice profile information. The method includes performing, by the NSSMS_P, a feasibility check to determine whether the received request for network slice requirement can be supported by the producer, and sending, by the NSSMS_P, at least one updated slice profile to the NSSMS_C on determining that the feasibility check is infeasible, wherein the updated slice profile includes the recommended network slicing related requirements which can be supported by the NSSMS_P.

In accordance with another aspect of the disclosure, methods for managing network slice subnet feasibility by a NSSMS_P in a wireless network are provided. The method includes receiving, from a NSSMS_C, a service level agreement (SLA) requirements with respect to a slice profile, determining, by NSSMS_P, whether the received SLA with respect to the slice profile can be fulfilled by performing a feasibility job check (IOC), and sending, by the NSSMS_P, an updated at least one slice profile including an updated set of SLA that can be fulfilled by the NSSMS_P to the NSSMS_C if the feasibility job check is unsuccessful.

In accordance with another aspect of the disclosure, methods for managing network slice subnet feasibility by NSSMS_C in a wireless network are provided. The method includes sending by a network slice subnet management service consumer (NSSMS_C), an SLA requirements with respect to a slice profile to a NSSMS_P, receiving by NSSMS_C, an updated slice profile including an updated set of SLA by the NSSMS_P to the NSSMS_C, wherein the updated slice profile is received by the NSSMS_C if the received original SLA requirements cannot be fulfilled by NSSMS_P, wherein the NSSMS_P determines if the SLA requirements with respect to a slice profile can be fulfilled or not based on a feasibility check performed by NSSMS_P.

In accordance with another aspect of the disclosure, a device for managing network slice subnet feasibility in a wireless network is provided. The device comprising a NSSMS_P and a NSSMS_C configured to receive a request for feasibility check of at least one network slice requirement from NSSMS_C, wherein the slice requirement includes at least one service profile and slice profile information, perform a feasibility check to determine whether the received request for network slice requirement can be supported by the producer, and send at least one updated slice profile to the NSSMS_C on determining that the feasibility check is infeasible, wherein the updated slice profile includes the recommended network slicing related requirements which can be supported by the NSSMS_P.

In accordance with another aspect of the disclosure, a device for managing network slice subnet feasibility by a NSSMS_P in a wireless network is provided. The device is configured to receive a SLA requirement with respect to a slice profile, determine whether the received SLA with respect to the slice profile can be fulfilled by performing a feasibility job check IOC, and send an updated at least one slice profile including an updated set of SLA that can be fulfilled by the NSSMS_P to the NSSMS_C if the feasibility job check is unsuccessful.

In accordance with another aspect of the disclosure, a device for managing network slice subnet feasibility by NSSMS_C in a wireless network is provided. The device is configured to send an original SLA requirement with respect to a slice profile to a NSSMS_P, receive an updated slice profile including an updated set of SLA by the NSSMS_P to the NSSMS_C, wherein the updated slice profile is received by the NSSMS_C if the received original SLA requirements cannot be fulfilled by NSSMS_P, wherein the NSSMS_P determines if the SLA requirements with respect to a slice profile can be fulfilled or not based on a feasibility check performed by NSSMS_P.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
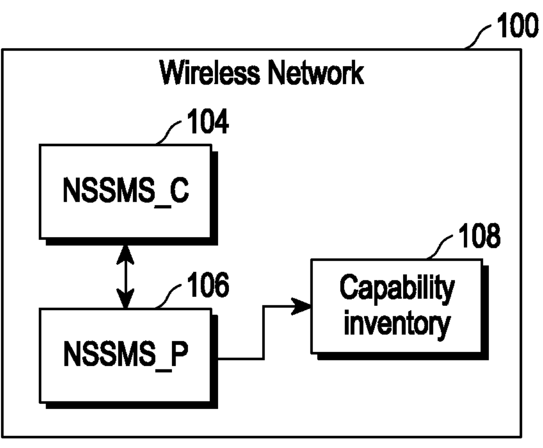
FIG. 1 illustrates a wireless network comprising a network slice subnet management service consumer (NSSMS_C), a network slice subnet management service producer (NSSMS_P) connected to a capability inventory of a slice subnet according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

The embodiments herein disclose methods and systems for managing network slice subnet feasibility in a wireless network by receiving a request for feasibility check of at least one network slice requirement from a network slice subnet management service consumer (NSSMS_C), wherein the slice requirement includes at least one service profile and slice profile information. Performing a feasibility check to determine whether the received request for network slice requirement can be supported by the producer and sending, by a network slice subnet management service producer (NSSMS_P), at least one updated slice profile to the NSSMS_C on determining that the feasibility check is infeasible, wherein the updated slice profile includes the recommended network slicing related requirements which can be supported by the NSSMS_P.

Referring to the drawings, and more particularly to FIGS. 1 through 6, where similar reference characters denote corresponding features consistently throughout the figures, there are shown example embodiments.

FIG. 1 illustrates a wireless network comprising a NSSMS_C, a NSSMS_P connected to a capability inventory of a slice subnet according to an embodiment of the disclosure.

Referring to FIG. 1, a wireless network 100 referred to herein can be at least one of a 3$^{rd}$ generation partnership project (3GPP) network, a centralized radio access network (RAN) network, a cloud RAN network, a virtualized RAN a long term evolution (LTE)/4G network, an LTE advanced network, a fifth generation/new radio (5G) network, worldwide interoperability for microwave access (WiMAX/IEEE 802.16), Wi-Fi (IEEE 802.11), a 5G based wireless communication system, a 4G based wireless communication system, Wi-Fi Direct, a millimeter wave (mmWave) network, a centimeter-wave 5G network, and so on.

Network slicing is a service provided in the 5G networks in which the resources are logically allocated in portions or slices for use by the end users. The network slice instance referred to herein may be a set of network functions and/or resources that are arranged and configured to form and meet a specific set of network requirements or characteristics. For example, a network slice instance for accessing network services may comprise of resources of a virtualized g-Node B.

A network slice instance may include resources of a virtualized network function repository function (NRF) configured to provide core network services for end users, such as an Internet of things (IoT) device and the like. The third-generation partnership project (3GPP) defines service orchestration procedures for the creation of network slices.

5G telecommunications management domain comprising management function, a network node that can provide functions or any services. A management function (MF) that is assigned to provide management related services is referred to herein as network slice subnet management service producer (NSSMS_P) 106. The management related services assigned to the NSSMS_P 106 may include but not limited to receiving requests from a NSSMS_C 104, receiving slice profile comprising original set of service level agreements (SLA) requirements, fetching available slice subnet capabilities from a capability inventory 108, performing feasibility check for the received slice profile from the NSSMS_C 104 and notifying the customer regarding the feasibility of the slice profile i.e., determining whether the received SLA requirements are satisfied or not.

Any entity/node in the network management domain that is assigned to consume services from the NSSMS_P 106 is referred to herein the NSSMS_C 104. The NSSMS_C 104 may be assigned to request the NSSMS_P with a slice profile using SLA requirements, on receiving unsuccessful feasibility check from the NSSMS_P. The consumer may create a slice profile based on the updated set of slice profile received from the producer and may perform NSSI allocation with the received slice profile from the producer.

An example of the core network in the wireless communications can be at least one of an evolved packet core (EPC), a 5G core (5GC), or the like. communication service management function (CSMF), network slices management function (NSMF) and network slice subnet management function (NSSMF) is the essential components of the core network. The CSMF can take business requirements from the core network and transform communication services requirements to network slice requirements which are consumed by the NSMF. Moreover, the NSMF is responsible for management and orchestration of network slice instance (NSI) and derive network slice subnet requirements. NSSMF is an external component and responsible for managing and orchestration of network slice subnet instance (NSSI).

The NSSMS_P 106 referred to herein may be also referred to herein by the terms "service provider", "provider", "producer", and so on interchangeably, which is authorized by the network operator or NSSMF to request for the network slice requested by the consumer. The NSSMS_P 106 can be a network entity assigned to provide services to the consumer.

The NSSMS_C 104 referred to herein may be also referred to herein by the terms "consumer", "service consumer", "end user", "customer", and so on interchangeably, which is authorized by the network operator or NSSMF to request for the network slice from the producer. The NSSMS_C 104 can be a network entity assigned to avail/consume services from the provider.

The slice profile in terms of SLA may be used by the NSSMS_C consumer 104 to request the NSSMS_P provider 106 for slice allocation. The slice profile comprises attributes may include, but not limited to, quality of service (QoS) requirements, such as to slice/service type (SST), bandwidth, throughput, latency, and maximum number of user equipment, maximum number of sessions, service area, and radio-spectrum and the like for utilizing network slice subnet instance (NSSI) allocation.

The NSSMS_C 104 can be configured to create a slice allocation request in terms of slice profile with the SLA requirements to be satisfied by the provider or NSSMS_P 106. The NSSMS_C 104 can create an instance of the request along with the requirements to be transmitted to the NSSMS_P 106. The NSSMS_P 106 can provide feasible SLA requirements in terms of the slice profile, which are fetched from the capability inventory. The capability inventory 108 can be a storage location in which the requirements of the slice subnet can be stored. The requirements of the slice subnet that can be satisfied by the NSSMS_P 106 can be fetched from the capability inventory 108. The feasible SLA requirements in terms of slice profile may include attributes with the default values that can be provided by the NSSMS_P 106.

The NSSMS_P 106 on receiving the slice allocation request from the consumer or NSSMS_C 104 can determine whether the requested slice subnet can be satisfied. The NSSMS_P 106 can perform this feasibility check by determining the values of attributes requested by the consumer. The NSSMS_P 106 can perform the feasibility check by determining whether the attributes of the requested slice subnet match the attributes of the fetched capability of the slice subnet from the capability inventory 108.

On obtaining successful feasibility check (i.e., the attributes of the requested slice allocation match the attributes of the fetched capability), the NSSMS_P 106 can provide slice allocation to the requested NSSMS_C 104 or the consumer. Thereby, the NSSMS_P 106 can satisfy the consumer 104 by allocating slice subnet to the requested consumer.

If the values of the requested attributes do not match the fetched slice subnet from the capability inventory 108, it can be determined that the feasibility check has failed. On determining that the feasibility check has failed, the NSSMS_P 106 can transmit an updated slice profile to the consumer 104. The updated slice profile comprising attributes with the updated values.

In an example, the slice profile with the service level agreements (SLA) requirements requested by the consumer may comprise SST=enhanced mobile broadband (eMBB), S-NSSAI an identifier for Network Slice across 5G-RAN and the UE; UE per slice with the down-link (DL)=100 Mbps and up-link (UL)=10 Mbps, latency=10 ms, maximum number of services=100, user equipment (UEs)=200, service area=TA1 and radio spectrum=28 GHz. The above slice profile with the SLA requirements can be requested to the NSSMS_P 106, which in turn can fetch capabilities of the slice subnet from the capability inventory 108. The capabilities received from the capability inventory 108 may include SST=enhanced mobile broadband (eMBB), S-NSSAI an identifier for Network Slice across 5G-RAN and the UE; UE per slice with the down-link (DL)=50 Mbps and up-link (UL)=5 Mbps; latency=7 ms; maximum number of services=100, user equipment (UEs)=100; Service Area=TS1 and radio spectrum=700 MHz.

The NSSMS_P 106, on receiving capabilities from the capability inventory 108, can determine whether the slice profile requested by the consumer can be satisfied or not.

The NSSMS_P 106 can notify the NSSMS_C 104 related to the result of feasibility check. The NSSMS_P 106 on obtaining successful feasibility can provide NSSI allocation to the requested consumer 104.

On receiving an unsuccessful feasibility check, the NSSMS_C 104 can receive updated slice profile from the NSSMS_P 106 with the updated attributes to the corresponding value based on the available slice subnet capabilities fetched from the capability inventory 108. On receiving the updated slice profile, the NSSMS_C or the consumer 104 can create a slice profile based on the received updated slice profile set. The NSSMS_C 104 can initiate a slice allocation based on the updated slice profile transmitted by the NSSMS_P 106.

FIG. 1 shows elements of the wireless network 100, but it is to be understood that other embodiments are not limited thereon.

In other embodiments, the wireless network 100 may include less or a greater number of elements/units. Further, the labels or names of the units are used only for illustrative purpose and does not limit the scope of the embodiments herein. One or more units can be combined together to perform same or substantially similar function in the wireless network 100.

Figure 2:
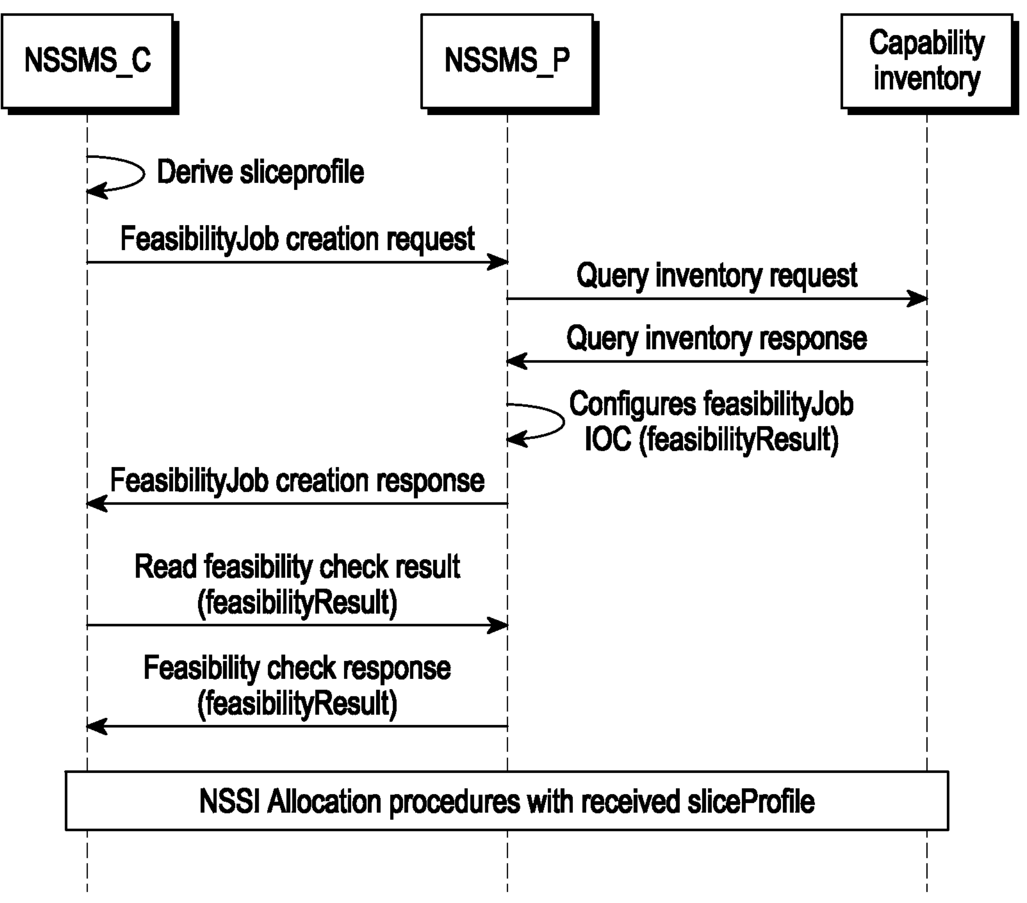
FIG. 2 illustrates a procedural flow diagram for illustrating slice subnet feasibility check performed by the NSSMS_P according to an embodiment of the disclosure.

FIG. 2 illustrates a procedural flow diagram for illustrating slice subnet feasibility check performed by the NSSMS_P, according to an embodiment of the disclosure.

Referring to FIG. 2, the NSSMS_C 104 can derive slice subnet requirements as a slice profile request for checking the network slice subnet feasibility in terms of service level agreements (SLA) requirements.

The slice profile comprises attributes may include but not limited to quality of service (QoS) requirements, such as to slice/service type (SST), bandwidth, throughput, latency, and maximum number of user equipment, maximum number of sessions, service area, and radio-spectrum and the like, for utilizing network slice subnet instance (NSSI) allocation.

In an embodiment, the NSSMS_P 106 can be configured to fetch capabilities of the slice subnet from the capability inventory 108. The capability inventory 108 can be a database or a storage unit comprising the capabilities of the network slice allocation. In an embodiment herein, the capability inventory 108 can be a storage unit configured in the NSSMS_P 106. In an embodiment herein, the capability inventory 108 can be a standalone unit for providing slice allocation capabilities of the wireless network.

After receiving slice allocation request, the NSSMS_C derives slice subnet requirements as SliceProfile. The NSSMS_C will send a create MOI request to instantiate FeasibilityJob IOC. The FeasibilityJob IOC can be created and comprises the attributes as mentioned in the below table. The NSSMS_P uses getMOIAttributes operation to fetch the capabilities of the slice subnet. The NSSMS_P receives the capabilities. Based on the capabilities, the NSSMS_P decides if the requirements submitted as part of FeasibilityJob IOC, in step 2, can be satisfied. If the requirements can be satisfied, the NSSMS_P configures the value of attribute result to FEASIBLE. If the requirements cannot be satisfied, the NSSMS_P derives the updated SliceProfile and configures the attribute updatedSliceProfile with the same; and configures the value of attribute result to UN-FEASIBLE.

The NSSMS_P sends the FeasibilityJob creation response to NSSMS_C.

The NSSMS_C send getMOIAttributes request to read the value of feasibilityResult attribute. The NSSMS_P report the value to feasibilityResult attribute. If the value of the result attribute is FEASIBLE, the NSSMS_C initiate the NSSI Allocation procedure, based on the updated requirements provided in the updatedSliceProfile attribute.

Table 1 depicts the FeasibilityJob IOC. The FeasibilityCheckJob IOC contains the updated SliceProfile. This will be present if the feasibility with the original SliceProfile has failed.

TABLE 1

| Attribute Name | Cardinality | Qualifier | Description |
|---|---|---|---|
| sliceProfile | 1 | M | It describes the original SLA requirements submitted to check the feasibility for. |
| fCJobProgress | 1 | M | It tells the progress of the feasibility job process |
| feasibilityResult | 1 | M | It describes the result of the feasibility check |
| >>result | 1 | M | It describes the result either as FEASIBLE or UN-FEASIBLE |
| >>updatedSliceProfile | 1 | CM | It describes the updated set of SLA requirements derived based on the capabilities of the slice subnet. It will only be present if the value for result is UN-FEASIBLE |
| >>unFeasibleReason | 1 | CM | It describes the human readable reason for the failure. It will only be present if the value for result is UN-FEASIBLE |

The NSSMS_P can query the capability inventory by sending a request, to determine the existing slice capabilities. This can be used to determine whether the required SLA in the slice profile can be fulfilled.

Referring to FIG. 2, on determining that the feasibility check is unsuccessful, the NSSMS_P 106 can derive the updated slice profile to configure the updatedSliceProfile attributes of the FeasibilityJob IOC. Also, the provider can configure the value of attribute result to UN-FEASIBLE.

The consumer 104 can receives the updated slice profile as the value of the attribute updatedSliceProfile using the notifyMOIAttributeValueChangeNotification as defined in 3GPP TS 28.532. The NSSMS_C 104 can create a slice profile based on the updated slice profile set, as received from the NSSMS_P 106. The NSSMS_C 104 can initiate network slice subnet instance (NSSI) allocation based on the updated set of slice profile received by the NSSMS_P 106.

In an example herein, the NSSMS_C 104 can request the NSSMS_P with the maximum 1000 UEs, the producer NSSMS_P 106 can provide/support to a maximum of 995 UEs. The provider 106 can update the slice profile with the attributes corresponding to the available slice subnet capability fetched from the capability inventory 108. The provider NSSMS_P 106 can provide the updated slice profile which can be a subset of the original requirements or can provide a new requirement. For example, the NSSMS_C 104 requesting XXXX, the producer NSSMS_P 106 can suggest requesting for YYYY, which is in addition to XXXX.

Figure 3:
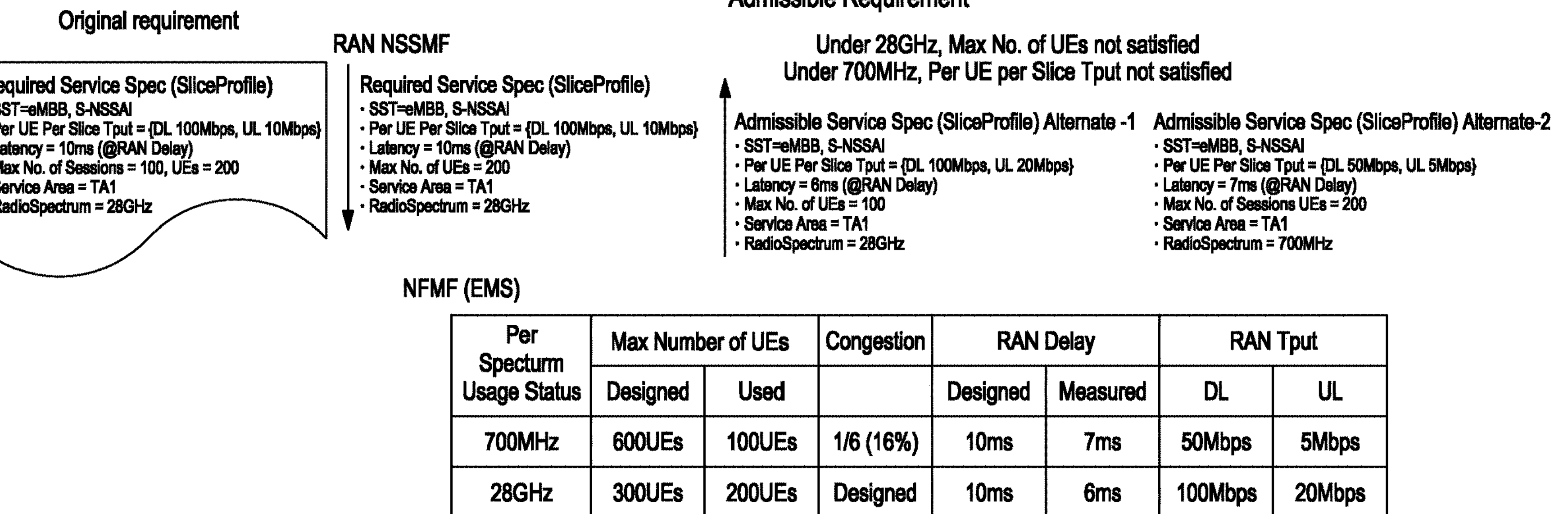
FIG. 3 illustrates a diagram depicting feasibility service level agreement (SLA) requirements according to an embodiment of the disclosure.

FIG. 3 illustrates a diagram depicting feasibility SLA requirements according to an embodiment of the disclosure.

Referring to FIG. 3, the slice profile comprises the original requirements with the attributes, such as SST=enhanced mobile broadband (eMBB), S-NSSAI an identifier for Network Slice across 5G-RAN and the UE; UE per slice with the down-link (DL)=100 Mbps and up-link (UL)=10 Mbps; latency=10 ms; maximum number of UEs for service=100, user equipment (UEs)=200; Service Area=TA1 and radio spectrum=28 GHz.

Referring to FIG. 3, the network slice subnet management function (NSSMF) is responsible for end-to-end creation, management and orchestration of network slice instance, network slice subnet instance. The NSSMF can transmit the original requirements to network function management function (NFMF). The NFMF can manage more than one network function and can fetch the capabilities of the capability inventory 108 which can be satisfied by the provider NSSMS_P 106. The NFMF can provide admissible requirements which can be satisfied by the provider NSSMS_P 106 based on the requested consumer 104.

The NFMF can provide alternate admissible requirements which can be satisfied by the provider NSSMS_P 106. In an example, the first alternate admissible slice profile can be updated with the following attribute values: SST=enhanced mobile broadband (eMBB), S-NSSAI (an identifier for Network Slice across 5G-RAN and the UE); UE per slice with the down-link (DL)=100 Mbps and up-link (UL)=20 Mbps; latency=6 ms (RAN delay); maximum number of UEs for service=100, user equipment (UEs)=200; Service Area=TA1 and radio spectrum=28 GHz.

The second alternate admissible slice profile can be updated with the following attribute values: SST=enhanced mobile broadband (eMBB), S-NSSAI (an identifier for Network Slice across 5G-RAN and the UE); UE per slice with the down-link (DL)=50 Mbps and up-link (UL)=5 Mbps; latency=7 ms (RAN delay); maximum number of sessions with UEs for service=200, user equipment (UEs) =200; Service Area=TA1 and radio spectrum=700 MHz.

In an embodiment herein, on determining that the feasible check was unsuccessful, the NSSMS_P 106 can provide the above mentioned admissible alternates. The capability inventory 108 can transmit admissible requirements that can be satisfied by the provider NSSMS_P 106. The provider NSSMS_P 106 can notify the consumer with the admissible/feasible requirements that can be satisfied. On receiving the admissible/feasible requirements using slice profile, the consumer 104 can create a slice profile based on the received updated set of slice profile from the provider NSSMS_P 106. The consumer 104 on creating the slice profile updated by the provider NSSMS_P 106 can initiate NSSI allocation based on the created slice profile.

Hence, the consumer 104 on creating the slice profile notified by the provider NSSMS_P 106, the consumer can initiate the network slice subnet instance (NSSI) allocation. Further, the consumer 104 can be allocated with the network slice with the admissible requirements provided by the provider NSSMS_P 106.

Figure 4:
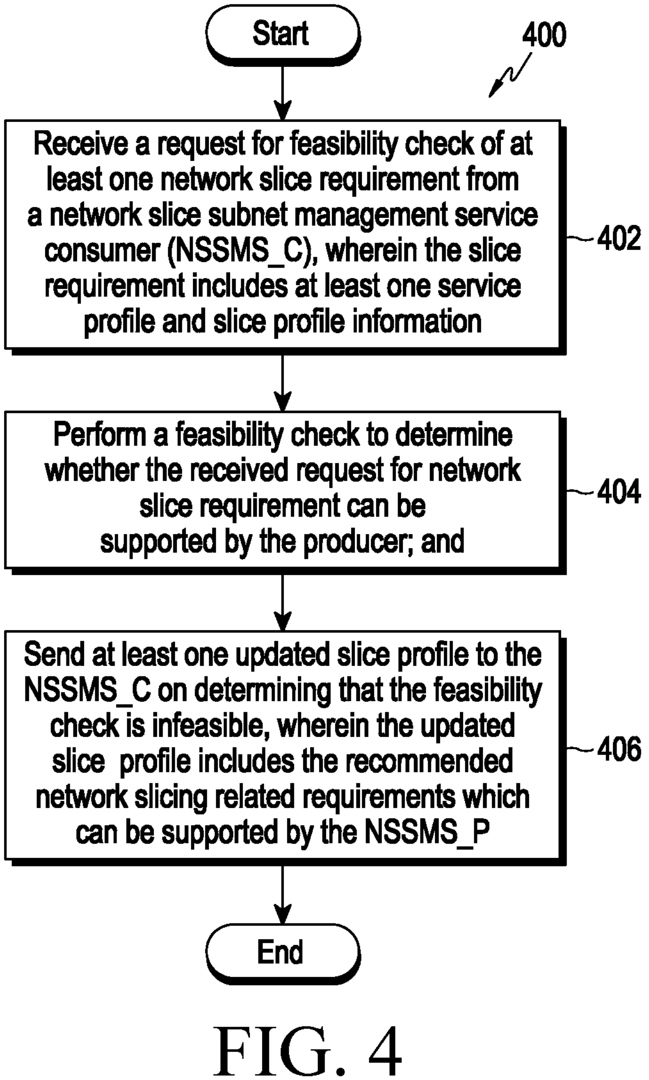
FIG. 4 illustrates a flow diagram illustrating a method for managing network slice subnet feasibility in a wireless network according to an embodiment of the disclosure.

FIG. 4 illustrates a flow diagram illustrating a method for managing network slice subnet feasibility in a wireless network according to an embodiment of the disclosure.

Referring to FIG. 4, at operation 402, the method includes, receiving, by a by a NSSMS_P, a request for feasibility check of at least one network slice requirement from a network NSSMS_C, wherein the slice requirement includes at least one service profile and slice profile information;

Referring to FIG. 4, at operation 404, the method includes, performing, by the NSSMS_P, a feasibility check to determine whether the received request for network slice requirement can be supported by the producer.

Referring to FIG. 4, at operation 406, the method includes, sending, by a NSSMS_P, at least one updated slice profile to the NSSMS_C on determining that the feasibility check is infeasible, wherein the updated slice profile includes the recommended network slicing related requirements which can be supported by the NSSMS_P.

The various actions, acts, blocks, operations, or the like in the method and a flow diagram 400 may be performed in the order presented, in a different order or simultaneously. Further, in some embodiments, some of the actions, acts, blocks, operations, or the like may be omitted, added, modified, skipped, or the like without departing from the scope of the disclosure.

Figure 5:
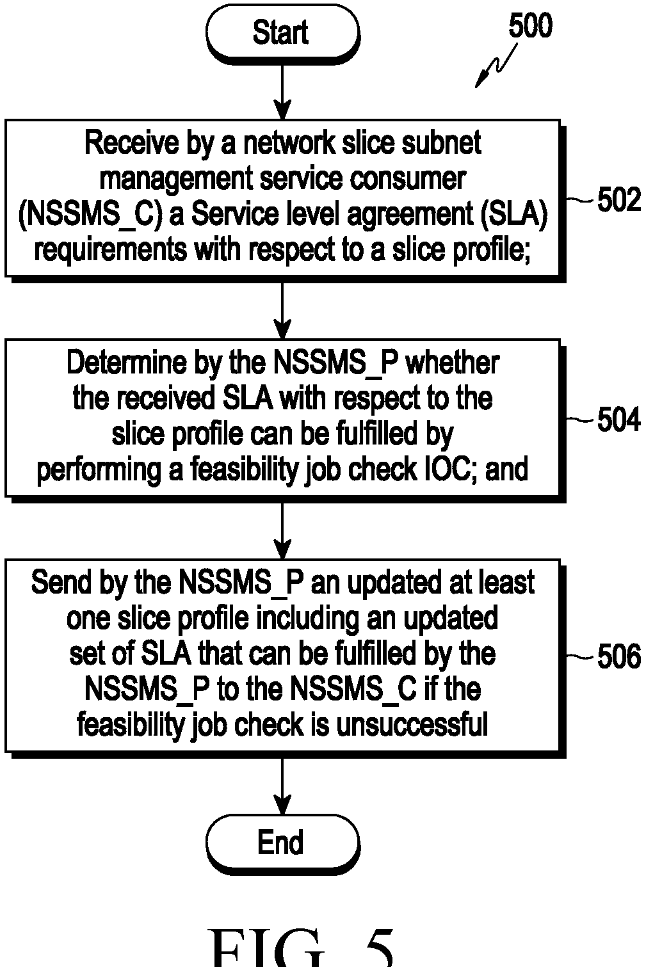
FIG. 5 illustrates a flow diagram illustrating a method for managing network slice subnet feasibility by a network slice subnet management service producer in a wireless network according to an embodiment of the disclosure.

FIG. 5 illustrates a flow diagram illustrating a method for managing network slice subnet feasibility by a network slice subnet management service producer according to an embodiment of the disclosure.

Referring to FIG. 5, at operation 502, the method includes, receiving, by a NSSMS_C, a service level agreement (SLA) requirements with respect to a slice profile.

Referring to FIG. 5, at operation 504, the method includes, determining, by the NSSMS_P, whether the received SLA with respect to the slice profile can be fulfilled by performing a feasibility job check IOC; and Referring to FIG. 5, at operation 506, the method includes, sending, by the NSSMS_P, an updated at least one slice profile including an updated set of SLA that can be fulfilled by the NSSMS_P to the NSSMS_C if the feasibility job check is unsuccessful.

The various actions, acts, blocks, operations, or the like in the method and a flow diagram 500 may be performed in the order presented, in a different order or simultaneously. Further, in some embodiments, some of the actions, acts, blocks, operations, or the like may be omitted, added, modified, skipped, or the like without departing from the scope of the disclosure.

Figure 6:
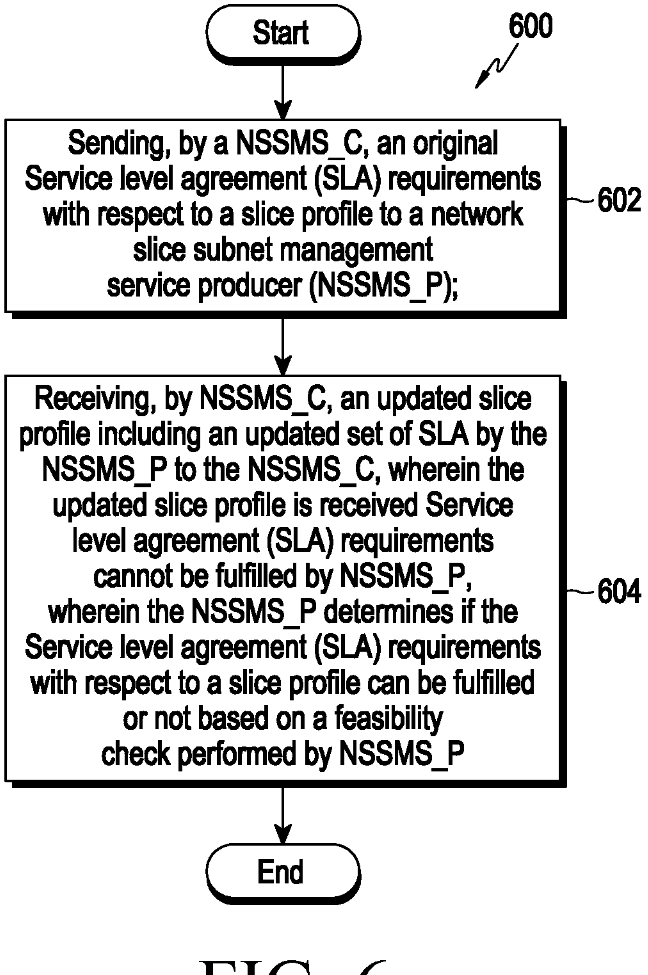
FIG. 6 illustrates a flow diagram illustrating a method for managing network slice subnet feasibility by NSSMS_C in a wireless network according to an embodiment of the disclosure.

FIG. 6 illustrates a flow diagram illustrating a method for managing network slice subnet feasibility by NSSMS_C in a wireless network according to an embodiment of the disclosure.

Referring to FIG. 6, at operation 602, the method includes, sending, by a NSSMS_C, an original service level agreement (SLA) requirements with respect to a slice profile to a network slice subnet management service producer (NSSMS_P); and Referring to FIG. 6, at operation 604, the method includes, receiving, by NSSMS_C, an updated slice profile including an updated set of SLA by the NSSMS_P to the NSSMS_C, wherein the updated slice profile is received by the NSSMS_C if the received original service level agreement (SLA) requirements cannot be fulfilled by NSSMS_P, wherein the NSSMS_P determines if the service level agreement (SLA) requirements with respect to a slice profile can be fulfilled or not based on a feasibility check performed by NSSMS_P.

The various actions, acts, blocks, operations, or the like in the method and a flow diagram 600 may be performed in the order presented, in a different order or simultaneously. Further, in some embodiments, some of the actions, acts, blocks, operations, or the like may be omitted, added, modified, skipped, or the like without departing from the scope of the disclosure.

Figure 7:
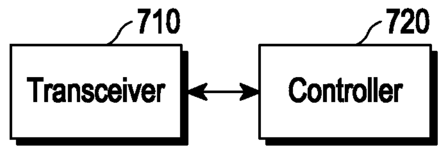
FIG. 7 illustrates a schematic diagram of a network slice subnet management service provider entity according to an embodiment of the disclosure.

FIG. 7 illustrates a schematic diagram of a network slice subnet management service provider entity according to an embodiment of the disclosure.

Referring to FIG. 7, the provider entity according to an embodiment of the disclosure includes a transceiver (710), and a controller (720).

According to another aspect of the present disclosure, there is provided a network slice subnet management service provider entity in a wireless communication system, comprising: a transceiver (710) configured to transmit and receive a signal; and a controller (720) coupled to the transceiver and configured to perform operations in the method as described above.

Figure 8:
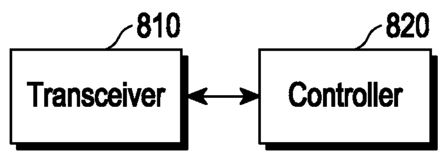
FIG. 8 illustrates a schematic diagram of a network slice subnet management service consumer entity according to an embodiment of the disclosure.

FIG. 8 illustrates a schematic diagram of a network slice subnet management service consumer entity according to an embodiment of the disclosure.

Referring to FIG. 8, the consumer entity according to an embodiment of the disclosure includes a transceiver (810), and a controller (820).

According to another aspect of the present disclosure, there is provided a network slice subnet management service consumer entity in a wireless communication system, comprising: a transceiver (810) configured to transmit and receive a signal; and a controller (820) coupled to the transceiver and configured to perform operations in the method as described above.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a network slice subnet management service (NSS MnS) provider entity in a wireless communication system, the method comprising:

receiving, from an NSS MnS consumer entity, a request message for a feasibility check of at least one network slicing related requirement;

performing the feasibility check to determine whether the at least one network slicing related requirement is satisfied; and transmitting, to the NSS MnS consumer entity, a response message, wherein, in case that a result of the feasibility check is infeasible, the response message includes at least one recommended requirement for adjusting the at least one network slicing related requirement of the NSS MnS consumer entity, the at least one recommended requirement being related to network slicing, and wherein the at least one recommended requirement is supported by the NSS MnS provider entity.

2. The method of claim 1, wherein the at least one network slicing related requirement includes at least one of at least one service profile, and slice profile information.

3. The method of claim 1, wherein the at least one recommended requirement is included in a Feasibility CheckJob information object class (IOC).

4. The method of claim 1, further comprising:

updating at least one slice profile with at least one attribute based on an available slice subnet capability fetched from an inventory and the at least one network slicing related requirement.

5. A network slice subnet management service (NSS MnS) provider entity in a wireless communication system, the NSS MnS provider entity comprising:

a transceiver; and a controller coupled to the transceiver and configured to:

receive, from an NSS MnS consumer entity, a request message for a feasibility check of at least one network slicing related requirement, perform the feasibility check to determine whether the at least one network slicing related requirement is satisfied, and transmit, to the NSS MnS consumer entity, a response message, wherein, in case that a result of the feasibility check is infeasible, the response message includes at least one recommended requirement for adjusting the at least one network slicing related requirement of the NSS MnS consumer entity, the at least one recommended requirement being related to network slicing, and wherein the at least one recommended requirement is supported by the NSS MnS provider entity.

6. The NSS MnS provider entity of claim 5, wherein the at least one network slicing related requirement includes at least one of at least one service profile, and slice profile information.

7. The NSS MnS provider entity of claim 5, wherein the at least one recommended requirement is included in a FeasibilityCheckJob information object class (IOC).

8. The NSS MnS provider entity of claim 5, the controller is further configured to:

update at least one slice profile with a plurality of attributes based on an available slice subnet capability fetched from an inventory and the at least one network slicing related requirement.

9. A method performed by a network slice subnet management service (NSS MnS) consumer entity in a wireless communication system, the method comprising:

transmitting, to an NSS MnS provider entity, a request message for a feasibility check of at least one network slicing related requirement;

receiving, from the NSS MnS provider entity, a response message, wherein, in case that a result of the feasibility check is infeasible, the response message includes at least one recommended requirement related to network slicing; and adjusting the at least one network slicing related requirement based on the at least one recommended requirement related to network slicing, wherein the at least one recommended requirement related to network slicing is supported by the NSS MnS provider entity.

10. The method of claim 9, wherein the at least one network slicing related requirement includes at least one of at least one service profile, and slice profile information.

11. The method of claim 9, wherein the at least one recommended requirement is included in a Feasibility CheckJob information object class (IOC).

12. The method of claim 9, wherein the at least one network slicing related requirement is used for updating at least one slice profile with at least one attribute, with an available slice subnet capability fetched from an inventory.

13. A network slice subnet management service (NSS MnS) consumer entity in a wireless communication system, the NSS MnS consumer entity comprising:

a transceiver; and a controller coupled to the transceiver and configured to:

transmit, to an NSS MnS provider entity, a request message for a feasibility check of at least one network slicing related requirement receive, from the NSS MnS provider entity, a response message, wherein, in case that a result of the feasibility check is infeasible, the response message includes at least one recommended requirement related to network slicing, and adjust the at least one network slicing related requirement based on the at least one recommended requirement related to network slicing, wherein the at least one recommended requirement related to network slicing is supported by the NSS MnS provider entity.

14. The NSS MnS consumer entity of claim 13, wherein the at least one network slicing related requirement includes at least one of at least one service profile, and slice profile information.

15. The NSS MnS consumer entity of claim 13, wherein the at least one recommended requirement is included in a FeasibilityCheckJob information object class (IOC).

16. The NSS MnS consumer entity of claim 13, wherein the at least one network slicing related requirement is used for updating at least one slice profile with at least one attribute, with an available slice subnet capability fetched from an inventory.

* * * * *